United States Patent
Lin et al.

(10) Patent No.: US 8,477,266 B2
(45) Date of Patent: Jul. 2, 2013

(54) DISPLAY BACKLIGHT MODULE AND METHOD FOR THE SAME

(75) Inventors: Chao-Ying Lin, Taipei County (TW); Jen-Huai Chang, Taoyuan County (TW)

(73) Assignee: Extend Optronics Corp., Taoyuan County (TW)

( * ) Notice: Subject to any disclaimer, the term of this patent is extended or adjusted under 35 U.S.C. 154(b) by 215 days.

(21) Appl. No.: 13/030,310

(22) Filed: Feb. 18, 2011

(65) Prior Publication Data
US 2012/0212689 A1 Aug. 23, 2012

(51) Int. Cl.
*G02F 1/1335* (2006.01)

(52) U.S. Cl.
USPC .......... 349/69; 349/62; 349/63; 349/64; 349/65; 349/66; 349/67; 349/68

(58) Field of Classification Search
USPC ...................................... 349/62–69
See application file for complete search history.

(56) References Cited

U.S. PATENT DOCUMENTS

2006/0290844 A1* 12/2006 Epstein et al. ............... 349/113
2009/0079909 A1* 3/2009 Ouderkirk et al. ............ 349/67

* cited by examiner

*Primary Examiner* — Phu Vu
(74) *Attorney, Agent, or Firm* — Rosenberg, Klein & Lee (57) ABSTRACT

Disclosed are a display backlight module and its manufacturing method. A multilayer reflector is particularly introduced into the display backlight module for a LCD display. The multilayer reflector is composed of a plurality of inter-stacked polymer films with various indexes of refraction. With introduction of interference principle, the multilayer reflector is designed to reflect or transmit the light with a specific wavelength range for acquiring a more uniform backlight. According to one of the embodiments, the display backlight module includes a backlight module, such as a direct-type or an edge-type light source. The module further includes the multilayer reflector and an optical-film module. This optical-film module optionally includes a brightness-enhancement film and a diffuser.

12 Claims, 6 Drawing Sheets

DISPLAY BACKLIGHT MODULE AND METHOD FOR THE SAME

BACKGROUND OF THE INVENTION

1. Field of the Invention

The instant disclosure relates to a display backlight module and a method for manufacturing the same, in particular, to the backlight module disposed with a multi-layer reflective film with a feature of adjustable wavelength range of a light.

2. Description of Related Art

The backlight module applied to a liquid crystal display (LCD) panel is generally classified into two backlight types, preferably are an edge-type backlight and a direct-type backlight.

Figure 1:
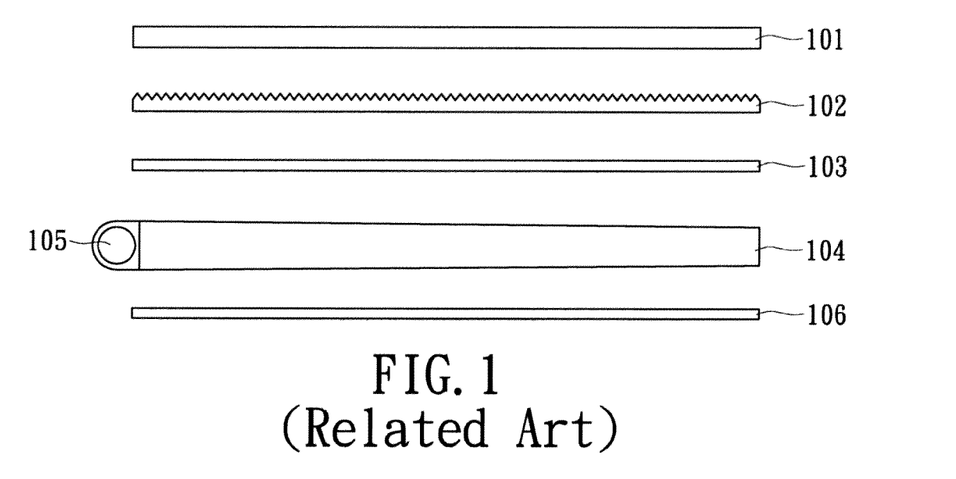
FIG. 1 shows a schematic diagram of a conventional edge-type backlight module.

Refer to FIG. 1, an edge-type backlight module is shown. The light source is disposed on one side of the panel and preferably implemented as a cold cathode fluorescent lamp (CCFL) or a light emitting diode (LED). This edge-type backlight module is disposed below a liquid crystal display panel 101. The backlight module generally includes a prism plate 102 for advancing light diffusion. The backlight module also has a diffusion film 103 for averaging the outgoing light. The backlight module further includes a wedged-type light-guide plate 104. The light source 105 is disposed on one side of the light-guide plate 104. Below the backlight module, a light-reflecting plate 106 is disposed to reflect the downward light and guide to the panel.

The light is emitted from the light source 105. The emitting light may be fully distributed over the display panel from the light-guide plate 104. The downward light may be reflected and enter the panel by the light-reflecting plate 106. The upward light can be uniformed through an optical system assembled with a diffusion film 103 and a prism plate 102. The diffusion film 103 may minimize the uneven problem caused by the interference. Therefore, the backlight module provides a uniform light to the liquid crystal display panel 101.

The mentioned optical components are such as diffusion film 103 and light-guide plate 104. By implanting some diffusing particles or any related structure inside or on the surface of the optical components, the incident light may be disorderly to implement uniform light through reflections and refractions.

Figure 2:
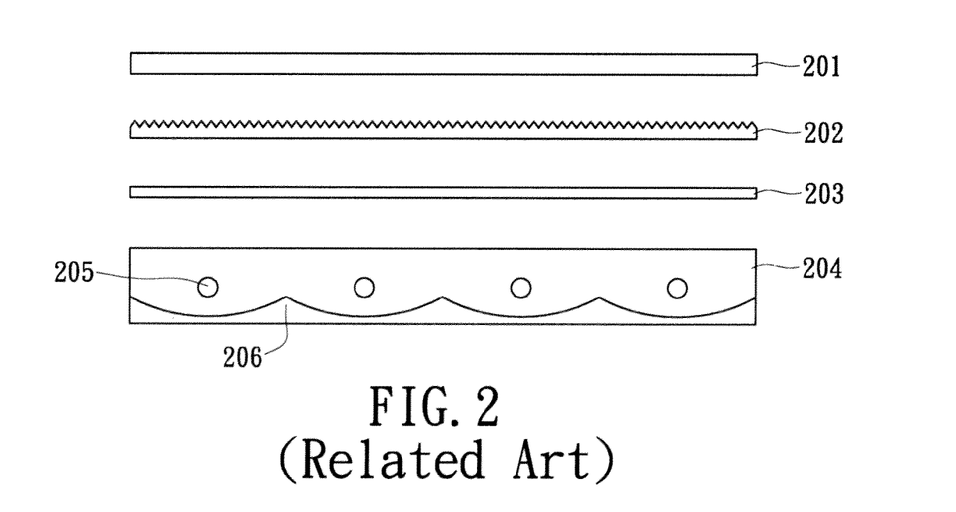
FIG. 2 shows a schematic diagram of a conventional direct-type backlight module.

FIG. 2 further shows a schematic diagram of the conventional direct-type backlight module. The direct-type backlight module is implemented by disposing the CCFLs or LEDs underneath the liquid crystal display panel 201. The direct-type backlight module also includes a prism plate 202 for advancing the light diffusion, and a diffusion film 203 for averaging the outgoing light. The backlight module further includes a light source 205 and a lamp box 204 having a light-reflecting structure 206.

Other than the edge-type backlight module, the direct-type may project the light into the liquid crystal display panel 201 directly. For acquiring an even light source, the mentioned optical components such as prism plate and diffusion film are requisite. Further, some diffusing particles or structure may be implanted into the structure.

Figure 3:
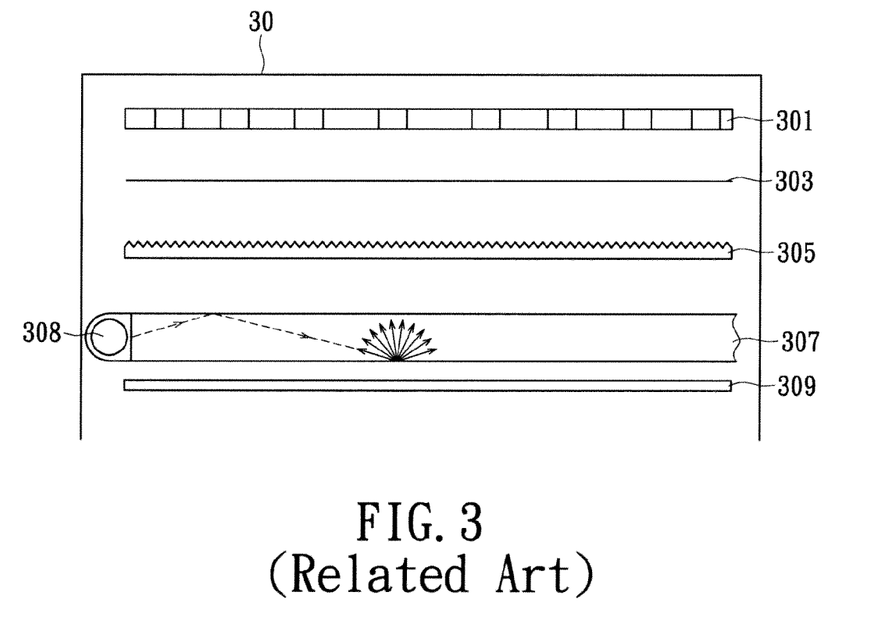
FIG. 3 shows a schematic diagram of a conventional backlight module applied to a LCD.

The mentioned optical components of the conventional backlight module may be referred to the optical module used in the display disclosed in U.S. Pat. No. 7,763,331. The related diagram is shown in FIG. 3.

An LCD device 30 is shown in the diagram. A liquid crystal panel 301 and its underneath backlight optical module are shown. The optical module includes an optical film 303, a brightness-enhancement film 305, a light-guide plate 307, and a lateral light source 308. A light-reflecting plate 309 for reflecting the downward light is also included below the light-guide plate 307.

The optical film 303 may be a diffusion film, a reflective polarized film, or a brightness-enhancement film. The brightness-enhancement film may be implemented to enhance the brightness with a structural design, a polarized light recycling means, or both of them. In the instant example, the brightness-enhancement film 305 is disposed between the light-guide plate 307 and the liquid crystal panel 301. In general, the polarizing films may be disposed on both sides of the liquid crystal panel 301. The light may be consumed as passing through the optical film 303, the light-guide plate 307 and the polarizing film. Some conventional solutions are provided through a multi-layer reflective polarizer preferably formed of the brightness-enhancement film 305 (e.g., DBEF, cholesteric liquid crystal), metal wire grid brightness-enhancement film, and prismatic brightness enhancement film to improve the brightness of backlight, and to minimize energy consumption.

SUMMARY OF THE INVENTION

For providing a solution of the optical component in the backlight module other than the conventional backlight, the backlight module of the instant disclosure applied to an LCD is disclosed. The backlight module may incorporate an edge-type or a direct-type backlight source module. In particular, a multi-layer reflective film is disposed on one light-emitting surface of the backlight source module. This multi-layer reflective film is composed of a plurality of layers of inter-stacked polymers with different refractive indexes. One side of the multi-layer reflective film is attached with an optical film module. According to one of the embodiments, the optical film module at least has a film for enhancing the brightness, such as a brightness-enhancement film (BEF) or a dual brightness-enhancement film (DBEF), a cholesteric liquid crystal brightness-enhancement film, or a metal wire grid brightness-enhancement film. A diffusion film is further included.

According to one of the embodiments, the multi-layer reflective film is particularly disposed within the backlight module of the LCD. With an application of interference principle, the light with a specific wavelength range for reflection or transmittance is defined, and a more uniform back light can be obtained.

The embodiment of the backlight module incorporates an edge-type backlight source module or a direct-type backlight source module. The multi-layer reflective film and an optical film module are also incorporated to enhancing the brightness and diffusion.

As such the light source applied to the backlight module, a LED array may be implemented to the direct-type backlight source module. The LED array essentially includes the multiple white light LEDs, for example the LEDs in the array are formed of the multiple groups of combination of red, green and blue LEDs. The LEDs in the array may also be an assembly of blue LED and the yellow phosphor. The LED may be implemented as an assembly of an ultraviolet LED and the red, green or blue LED. Some other types of the LEDs are also the options of the backlight source.

The method for manufacturing the backlight module is firstly to prepare a liquid crystal display panel. An optical film module is then formed on one surface of the liquid crystal display panel. The optical film module at least includes a diffusion film and a brightness-enhancement film.

The multi-layer reflective film is formed of multiple inter-stacked polymer films, which have various refractive indexes, and is adhered with the optical film module. This assembly is disposed in the backlight source module.

In an example, the multi-layer reflective film may be formed by a co-extrusion process. A uniaxial stretching process is further introduced to form the optical component with polarization. Alternatively, a biaxial stretching process may be employed to form the optical component which is configured to control a ratio of the P-polarization and the S-polarization through the multi-layer reflective film. The optical component may be also configured to be the non-polarization component.

In one further embodiment, one surface of the multi-layer reflective film may be coated to form a kind of surface structure, or to have a plurality of diffusing particles.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

As to the backlight module of a conventional LCD, an optical film for enhancing brightness, diffusion, or evenness is usually adopted. The optical film is such as the brightness-enhancement film (BEF) made by 3M™ company, a brightness-enhancement film (DBEF), a cholesteric liquid crystal brightness-enhancement film, a metal wire grid brightness-enhancement film, an optical film formed by a multi-layer film configured to create multiple reflective optical paths, or optical structure with surface structure for providing diffusion.

It is noted that the display backlight module and its manufacturing method in the present disclosure is other than the conventional backlight module which merely adopts the brightness-enhancement film and diffusing plate. In particular, the backlight module of the present disclosure is disposed with a multi-layer reflective film formed of a plurality of inter-stacked polymer films with various refractive indexes.

In which, an interference principle is particularly configured to reflect or transmit the light with a specific wavelength range, and also to obtain the uniform backlight.

The mentioned polymer film may be one selected from a group, a copolymer, or a mixture formed of Polyethylene Terephthalate (PET), Polycarbonate (PC), Tri-acetyl Cellulose (TAC), Polymethylmethacrylate (PMMA), Methylmethacrylate styrene (MS), Polypropylene (PP), Polystyrene (PS), PMMA, copolymer (Cyclic Olefin Copolymer, COC), Polyethylene Naphthalate (PEN), Ethylene-Tetrafluoroethylene (ETFE), Polylactide (PLA), coPEN or coPET. The coPET and the coPEN are mixed into a copolymer with a specific ratio between the PET and the PEN.

According to one of the embodiments, the backlight module disposed below the liquid crystal display panel essentially includes a backlight source module and multiple layers of optical components. The optical components are such as the diffusion film and the brightness-enhancement film. The backlight source module may be an edge-type backlight source module or a direct-type backlight source module. In one preferred embodiment, the multi-layer reflective film is exemplarily disposed upon a light-emitting surface of the light-guide plate within the edge-type backlight source module.

Figure 4:
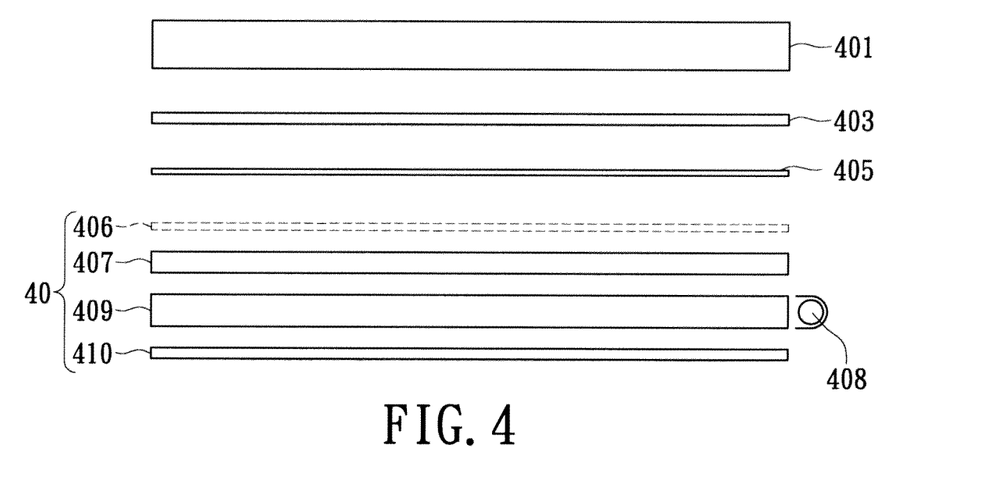
FIG. 4 schematically depicts an embodiment of a display backlight module in accordance with the present invention.

Further reference is made to FIG. 4 which shows a schematic diagram of the display backlight module in accordance with the instant disclosure. This example is such as the display employing the edge-type backlight source module. The major components at least have one backlight source module and an optical film module, including the brightness-enhancement film 403 and the diffusion film 405, below the liquid crystal display panel 401.

The backlight source module 40 is the edge-type backlight source in the present example. The multi-layer reflective film 407 has inter-stacked polymer films with multiple layers with various refractive indexes. This reflective film 407 is part of the backlight source module 40 and is disposed upon the module's light-emitting surface.

The main structure of the edge-type backlight source module 40 includes the multi-layer reflective film 407, an edge-type light source 408, a light-guide plate 409, and a light-reflecting component, which is preferably the light-reflecting plate 410 shown in the diagram. The light-guide plate 409 is coupled to the edge-type light source 408. The light-reflecting plate 410 is disposed on one side of the light-guide plate 409. The multi-layer reflective film 407 is then disposed on the other side of the light-guide plate 409, and this side of the plate 409 is preferably the light-emitting surface of the backlight source module 40.

Within the backlight source module 40, the configuration inside the light-guide plate 409 and its surface structure are able to guide the light of light source 408 to entering the backlight source module 40 effectively. When the light from the light source 408 enters the light-guide plate 409, the light may be split into an upward light and a downward light. The upward light may then reaches the multi-layer reflective film 407. The downward light may be reflected by the light-reflecting plate 410 and into the backlight source module 40. In one further embodiment, a diffusing plate 406 may be disposed upon the light-emitting surface of the backlight source module 40. This diffusing plate 406 is mainly used to provide a support of the whole structure and also the effect for uniformizing the light. The diffusing plate 406 is usually made of the above-mentioned PC, PMMA, MS, or PS. The thickness of the diffusing plate 406 is around 500 um to 6 mm. The effect provided by the diffusing plate 406 can be structurally made, or be added with diffusing particles therein. The assembly of the diffusing plate 406 and the multi-layer reflective film 407 may provide the even light more efficiently.

It is worth noting that a reflective cavity is defined between the multi-layer reflective film 407 and the light-reflecting plate 410. The light may be repeatedly reflected, refracted and scattered within this reflective cavity. Therefore, the configuration of the optical components in the backlight source module is able to uniform the light by means of increasing the optical paths, mixing the colors, and evenly distributing the illumination.

Figure 5:
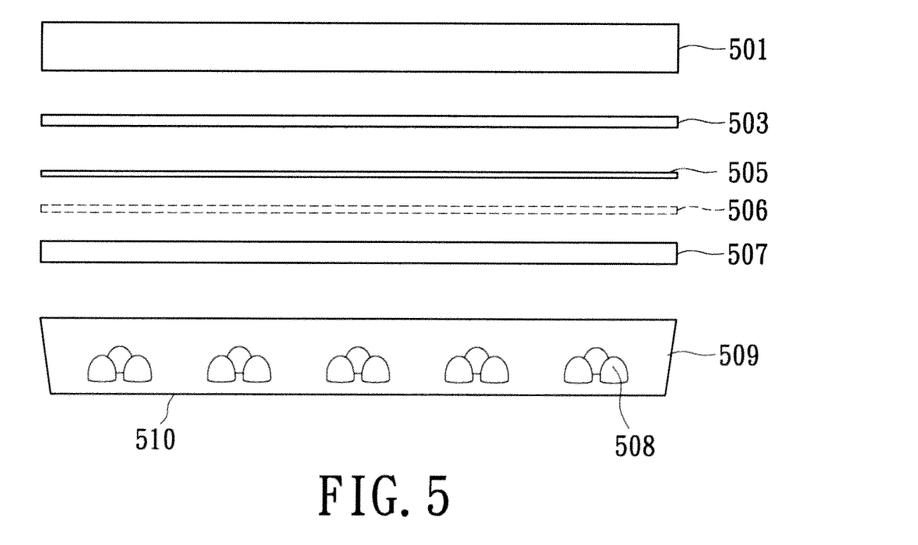
FIG. 5 schematically depicts one more embodiment of a display backlight module in accordance with the present invention.

The direct-type light source can be referred to FIG. 5 schematically showing the display backlight module in accordance with the present invention, especially the optical components disposed under the liquid crystal display panel 501.

The optical film module at least includes a brightness-enhancement film 503, and/or a diffusion film 505, and a diffusing plate 506. The claimed multi-layer reflective film 507 is then attached to these optical components. A direct-type backlight source module 509 is the backlight module beneath. This direct-type backlight source module 509 includes a light source 508 and an adjacent light-reflecting component. This light-reflecting component may be implemented as a shown light-reflecting plate 510, which is coupled to the light source 508, for reflecting the downward light.

In the present example, a reflective cavity is defined between the multi-layer reflective film 507 and the light-reflecting plate 510. The incident light may be repeatedly reflected, refracted, and scattered in the cavity for uniformizing the light.

In particular, the light source of the direct-type backlight source module may be an LED array, which is preferably formed by a plurality of red, green, and blue LEDs, but not limited to other types of LEDs.

The multi-layer reflective film particularly includes a plurality of layers of optical films with various refractive indexes. After the light from the backlight source module enters the multi-layer reflective film, multiple reflecting and transmitting paths are generated. However, the thinner structure to the multi-layer reflective film may consume much energy. Not only does the multi-layer reflective film create uniformization of the light, but also incorporates the interference principle to reflect or transmit the light with a specific wavelength range. This film allows the light with the specific wavelength range to be transmitted, but to reflect other range of light.

In one further embodiment, an ultraviolet reflector is added during manufacturing procedure of the optical films within the backlight module for reflecting the unnecessary ultraviolet radiation. This ultraviolet reflector may be formed on the other optical films by means of an extrusion process or a coating process. In the embodiment, the ultraviolet reflector, other than the material used to absorb the ultraviolet radiation, may be used to reflect the ultraviolet radiation generated from the LED. Laser diode, or CCFL. Furthermore, this reflected ultraviolet radiation may be reused. For example, the feature for effectively reflecting the ultraviolet radiation by the multiple optical films is configured to raise the efficiency of the backlight module since the light source is semiconductor type such as Laser LED, or LEDs.

The usual way to implement the semiconductor white-light source is such as the white-light light-emitting module formed of red, blue and green LEDs, which advantages high luminous efficiency and high color rendering. However, the LEDs of the light-emitting module may have different voltage characteristics because of the epitaxial materials for the dice with different colors are various. The LEDs may not be mixed easily and also cause high cost since they need complex control circuit. More, this type of LED may have poor color rendition since the behavior of red light spectrum is weaker.

The one further way to embody the white-light source is such as the widespread white LED made by Nichia Corporation. In which, this white LED is formed by a blue LED installed to photo-excite yellow YAG (Y3Al5O12:Ce) phosphor. Moreover, by the Nichia Corporation, the yellow YAG phosphor is mixed with optical cement with suitable ratio around the blue LED chip. This blue LED chip emits light within the wavelength ranging from 400 nm to 530 nm. The light emitted by the blue LED chip photo-excites the yellow phosphor to generate yellow light which is mixed with the part of emitted blue light.

The white light is then generated by suitably mixing the blue and yellow lights. However, the white light LED made by combination of blue LED, chip and yellow phosphor still has some drawbacks, including: the color temperature may be higher and uneven since the blue light occupies the most part of the spectrum. Therefore, the designer needs to improve the interaction between the blue light and the yellow phosphor. For example, it exemplarily reduces the blue illumination or raises intensity of yellow light. More, the white light may not be controlled easily since the optical wavelength of the blue LED changes with the higher temperature.

In one further way to obtain the white LED, an ultraviolet laser or ultraviolet LED is used to excite the transparent optical cement with a certain ratio among the blue, green and red phosphors. Therefore, three lights with different ranges of wavelength are blended into the white light. More particularly, the white light LED with the mixture of the three-wavelength lights may advantage the device to have high color rendering. However, the three-wavelength lights may not provide sufficient illuminative efficiency.

Current development of the white light LED is to utilize the UV or blue light-emitting chip collocated with a proper phosphor. The drawbacks of this type of LED include the insufficient brightness and difficulty of controlling the evenness of the light. One of the industrial applications considers providing sufficient luminosity of the LEDs by increasing light-transmittance and guiding or drawing more available light emission. For example, the introduction of transparent conductive material may increase the light emission of the chip. Any change of design of epitaxial wafer or structure of electrode may also increase the light emission.

In the example of the ultraviolet LED being the white light source, the ultraviolet radiation has to be isolated from the LED and to prevent any leakage since the ultraviolet radiation has shorter wavelength that may hurt the human's eyes. The multi-layer reflective film in accordance with the instant disclosure is not designed as an absorber for absorbing the ultraviolet radiation, but includes an ultraviolet reflector for the purpose of increasing emitting efficiency. Especially to the high color-rendering ultraviolet LED, the excited white light advances the efficiency. The mentioned design can be installed within the backlight module of the LCD module for enhancing the emitting efficiency and increasing the luminosity of backlight module. Further, the disposal of the multi-layer reflective film also enhances the luminance stability since it reduces the LED's sensitivity to temperature.

In one further example, if the ultraviolet LED and assembly of red, green and blue phosphors are to be the light source, the mentioned ultraviolet reflector may reflect the ultraviolet radiation from the light source back to the backlight source module, and then be reflected out. Not only does this configuration not affect other optical components, but also reuse the reflective radiation to excite the LED phosphor. Therefore, the design of ultraviolet reflector can enhance the luminous efficiency of LED. In which, some chemical components excitable by the ultraviolet radiation may be mixed into the phosphor of the design using the ultraviolet to produce the white light. In other words, a production of white light generally should have two elementary colors, therefore the excitation spectrum of the mentioned phosphor needs at least two peaks to produce the white light besides the emission of LED.

Some other optical components, such as diffusion film and brightness-enhancement film, may be disposed upon the surface of multi-layer reflective film. Therefore, the uniform light can be obtained. The diffusion film may have surface structure, implanted particles, diffusing particles, or internal blisters, by which those substances disorders the optical paths and results in diffusion. The brightness-enhancement film is used to enhance brightness of the light by producing reflections and transmissions and also functioned as a polarizer.

Figure 6:
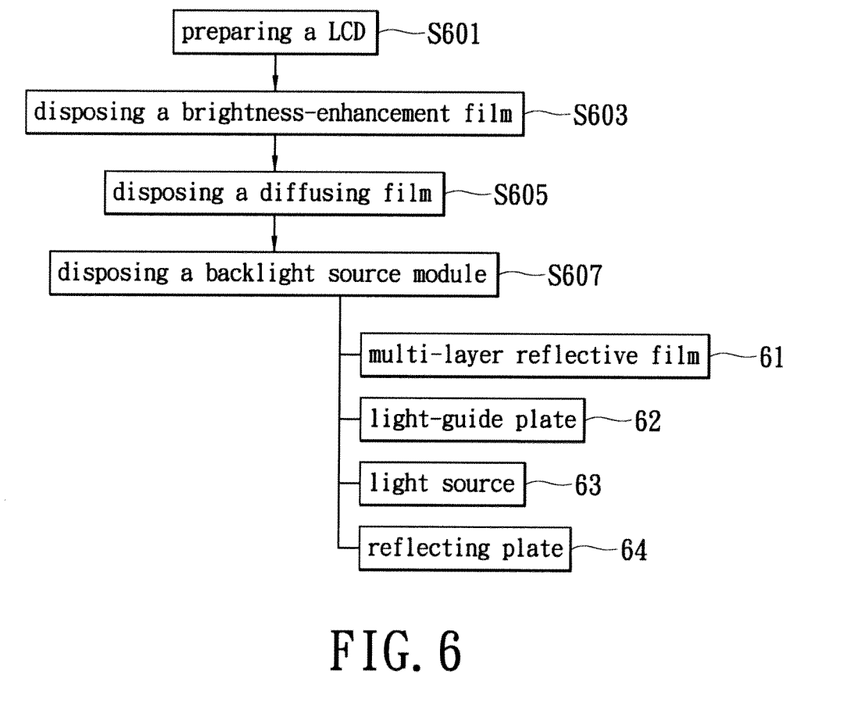
FIG. 6 illustrates a flow diagram of the method of manufacturing the backlight module in accordance with the present invention.

FIG. 6 describes a flow chart illustrating the manufacturing procedure of the backlight module.

In the beginning, such as step S601, a liquid crystal display panel is prepared. Under the panel, an optical film module is disposed. The optical film module may include many kinds of optical films, for example the brightness-enhancement film used to enhance brightness and polarization, such as BEF or DBEF made by 3M™ Company (step S603). A diffusion film for evenly distributing the light is also disposed (step S605).

The backlight source module is then disposed on one side of the backlight module and those optical components (step S607). This backlight source module is also on the side of the assembly of the liquid crystal display panel and the optical film module. The backlight source module is particularly an edge-type backlight source module including a light-guide plate (62), a light source (63) and a light-reflecting plate (64). In accordance with the invention, the multi-layer reflective film (61) is particularly attached.

In particular, an interference principle is introduced into the backlight source module with the multi-layer reflective film, and configured to reflect or allows to transmit the light with a wavelength range. As required, the backlight source module may also be a direct-type light source, in which the multi-layer reflective film is attached to the light-emitting surface thereof.

The multi-layer reflective film is formed of multiple layers with various refractive indexes, wherein the layers may be stacked in a specific order. References are also made to FIG. 7A and FIG. 7B. The exemplary example is shown as the polymeric optical film (701, 701', 703, 703', 705, 705', 707, 707'). Rather than the exemplarily shown structure, in practice, the multi-layer reflective film may be formed by stacking tens to hundreds of layers of optical films. The multiple layers are formed to conduct the interference. Therefore, the light entering the structure may be uniformized since it meets the multiple reflections. The portion of reflected light allows for enhancing the brightness since it emits out after the multiple reflections within the structure. The optical characteristics related to the thickness, material, and its degree of extension in the manufacturing method of the multi-layer reflective film can be modified according to the practical requirements. It is featured that the transmittance of the multi-layer reflective film lies in between 30% and 90% within the spectrum ranging from 400 nm to 700 nm, in which the multi-layer reflective film is modifiable, especially through a uniaxial or biaxial stretching process, as required.

The light source formed of various colors of LEDs, for example red, green and blue, may be unevenly mixed and resulted in phenomenon of color spots, that is called MURA. Through the uniaxial or biaxial stretching process to the multi-layer reflective film, the ratio of P-polarization and S-polarization can be modified. The biaxial stretching process may merely allow the light to become an unpolarized state. The assembly of the multi-layer reflective film and the adjacent optical module allows the light to extend its paths effectively since the light will be repeatedly reflected. Therefore, the uniformity of luminance and color of the backlight module can be enhanced, and the phenomenon of MURA can be essentially eliminated.

Besides the above-described structure of multiple layers, the multi-layer reflective film, in one further embodiment, includes an ultraviolet reflector formed by a co-extrusion process or a coating process. The ultraviolet reflector may be manufactured with additive transparent plastic particles for reflecting the ultraviolet radiation, and any other additive material. The one aspect for forming the multi-layer film includes a process of sputtering or evaporating anti-ultraviolet film on the multi-layer reflective films, or a process of plating the anti-ultraviolet film on a substrate, and then attached with the multi-layer reflective film. Therefore, the part of ultraviolet radiation may be reflected by the multi-layer reflective film. Furthermore, the mentioned ultraviolet reflector may be disposed on one side or both two side of the multi-layer reflective film. Alternatively, the anti-ultraviolet film may be formed inside the multi-layer reflective film. No matter what the type is adopted, the anti-ultraviolet film can effectively reflect the ultraviolet radiation and to obtain a certain wavelength range of the ultraviolet radiation for photo-exciting the phosphors.

During the process of manufacturing the backlight module, the mentioned uniaxial or biaxial stretching process may be introduced as forming the multi-layer reflective film. The stretching process, mechanically or artificially performed, is used to configure the physical characteristics by altering the molecular chain and alignment of the inside polymer. Some parameters dominating the stretching process may include temperature, speed of stretching, percentage of stretching, the direction of stretching, and also temperature and time to heat setting.

The magnification rate of the film made by the uniaxial stretching may up to 1.5 to 6 times, or even greater depending on request and its material. The film's material may be Polyethylene Terephthalate (PET), Polycarbonate (PC), Tri-acetyl Cellulose (TAC), Polymethylmethacrylate (PMMA), Methylmethacrylate styrene, Polypropylene (PP), Polystyrene (PS), PMMA, Cyclic Olefin Copolymer (COC), Polyethylene Naphthalate (PEN), or Ethylene-Tetrafluoroethylene (ETFE), Polylactide (PLA). The uniaxial stretching process allows the optical component to be with a polarization along a direction. The feature of polarization of light is referred to modulate the wavelength range thereof.

In one other aspect, the biaxial stretching process allows the two axes to have different stretching rates. The biaxial stretching process may be performed by two continuous stretching steps or two simultaneous steps. In addition to modulating the wavelength range, the stretching process is able to configure the ratio of the P-polarization and S-polarization of the light through the multi-layer reflective film, or even to approach an unpolarized state. The multi-layer reflective film may also be collocated with the characteristics of other types of optical films, such as the mentioned diffusion film and brightness-enhancement film. The assembly of the multi-layer reflective film and those other optical films can substantially uniformize and diffuse the light from the backlight module, and also be able to eliminate color aberration, modulate polarization state, modify the reflective index, and also remove the MURA phenomenon. Furthermore, the assembly may introduce the interference principle to modulating the light with a specific wavelength range.

Figure 7A:
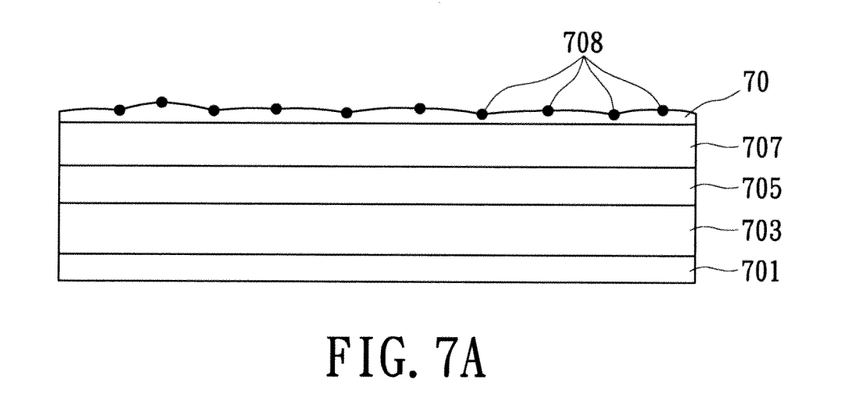
FIG. 7A and FIG. 7B show an embodiment of the structure of the multi-layer reflective film in accordance with the present invention.
Figure 7B:
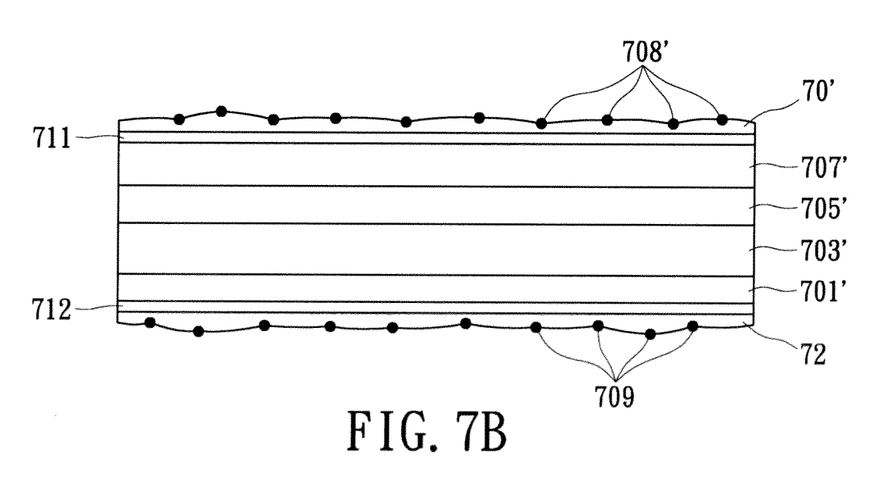

The FIG. 7A and FIG. 7B describe the diagrams of the structure of the multi-layer reflective film.

In the diagram of FIG. 7A, the main structure exemplarily includes several polymeric optical films 701, 703, 705, 707 of the multi-layer reflective film. A surface, defined as a first surface, thereon may be formed with a surface structure 70 by means of the extrusion process or coating process. The surface structure 70 generally is a microstructure with a length or width around 5 um to 100 um. The microstructure is generally formed as sphere, semi-sphere, prism, or pyramid-shaped structure, or other types of the structure conducting the diffusion. The microstructure may be evenly or randomly distributed over the surface of the film, therefore Moiré pattern originated from the stacked components can be removed. Those mentioned surface structure 70 is featured to increase the uniformity of the light since it disorders the optical paths from the light source, and increases the optical paths.

Furthermore, in an exemplary example, the shown diffusing particles 708 are formed on the surface structure 70, and configured to enhance the diffusion of the light. The diffusing particles 708 are formed by one type of polymer selected from acrylic, silicon dioxide, titanium dioxide, and the like. It is noted that one of the objectives of disposing the surface structure and any additive matters is to create the refractive lights and scattered lights. The shapes of the particles may be various, such as strip-like, oval-like, or circular-form material. In another example, the diffusing particles 708 may be mixed in the coating cement.

In FIG. 7B, the multi-layer reflective film exemplarily has several polymeric optical films 701', 703', 705', 707'. Two substrates 711, 712 are disposed on the surfaces of the main structure, and both sides including the defined first surface and second surface of the film structure are attached with optical glue. Next, surface structure 70' and 72 on the two sides are formed by coating process. The mentioned diffusing particles 708', 709 may be simultaneously formed inside for enhancing the diffusion of the multi-layer reflective film. In the present example, the diffusion film or other types of optical films in the backlight module may be attached upon the top surface of the surface structure 70 by a lamination process. Then the optical components in the backlight module may be assembled in one single module. For example, a first diffusion film is attached on the first surface of the multi-layer reflective film, and the second diffusion film is formed on the second surface of the reflective film. The mentioned diffusing particles are also embedded into both the first and second diffusion films.

The above-described substrates 711 and 712 are particularly the plastic materials formed as the support of the multi-layer reflective film. The substrates may be formed of, but not limited to, Polycarbonate (PC), Polypropylene (PP), Polystyrene (PS), PMMA, Methylmethacrylate styrene, ABS, PET, Polyoxymethylene (POM), Nylon, Polyethylene Naphthalate (PEN), CoPEN or CoPET Ethylene-Tetrafluoroethylene (ETFE) mixed by a certain proportion of PET and PEN, or Polylactide (PLA).

Figure 8:
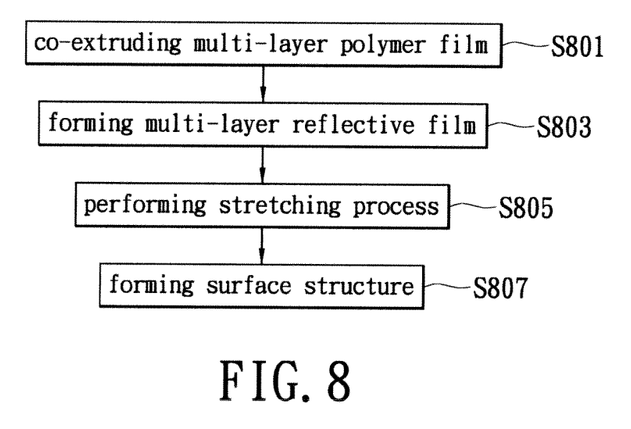
FIG. 8 is a flow chart illustrating the manufacturing method for the multi-layer reflective film in accordance with the present invention.

The flow chart of FIG. 8 describes the method for manufacturing the multi-layer reflective film.

In step S801, with the process of co-extrusion, the multiple layers of polymers form the multi-layer reflective film. In which, one or more extruders are separately output the various materials into a co-extrusion head. The extruded materials may be cooled down and shaped afterward, and then be drawn and truncated. The multi-layer reflective film is formed (step S803).

As to the above description, an online uniaxial stretching process may be performed after the extrusion process and before the shaping step. Alternatively, offline uniaxial stretching process may also be performed after a film-collecting process. After that, an optical component with polarization is formed.

In the other embodiment, an online or offline biaxial stretching process is also able to be performed to configure the proportion of P-polarization and S-polarization of the light from the multi-layer reflective film. This biaxial stretching process may also form the unpolarized multi-layer reflective film (step S805). The stretching process may alter the physical characteristics of the multi-layer reflective film, and manufacture the optical component which is able to reflect the light with a specific wavelength range. The ratio of the uniaxial or biaxial stretching process may be altered to configure the effect of polarization. After that, some types of surface structure may be formed on the surface of multi-layer reflective film (step S807). The way to form the surface structure 807 may introduce the coating process, or adhering process to form the optical film with surface structure on the film.

To sum up the above description, in addition to the display backlight module includes the optical film module with features of diffusion, polarization, and brightness-enhancement, the multi-layer reflective film formed of inter-stacked films with various refractive indexes is also introduced. The display backlight module in accordance with the instant disclosure concludes some following features:

1. The backlight module is capable of controlling the transmittance and reflectivity within a specific wavelength range, and a reflective cavity is defined between the multi-layer reflective film and the light-reflecting plate of the backlight source module. By which, the light may be repeatedly reflected, refracted, and scattered in order to increase the optical paths of the mixed lights and to uniform the emitting light.

2. The transmittance of the multi-layer reflective film is configurable by altering the materials, thicknesses, and stretching proportion.

3. By means of controlling the reflectivity and transmittance, and collocation with the diffusion film, the MURA phenomenon may be adjusted, and the multi-layer reflective film, as with auxiliary of the diffusing plate and the light-guide plate, may increase the evenness of the emitting light for the backlight module.

4. The uniaxial stretching process allows the multi-layer reflective film to be modifiable, and with different indexes of reflection and refraction under various polarizations. The brightness and uniformity of the backlight module can be modified, as with the other optical films, such as DBEF made by 3M™ company, by modifying the reflectivity and transmittance of the multi-layer reflective film.

5. An ultraviolet reflector is optionally disposed within the multi-layer reflective film, and thereby the unnecessary ultraviolet radiation from the light source can be reflected and be reused. The reflected ultraviolet radiation may then excite the certain composition of the light source (e.g., LED phosphor) to produce illumination with a specific wavelength range. Therefore, the luminous efficiency can be increased.

The above-mentioned descriptions represent merely the preferred embodiment of the present invention, without any intention to limit the scope of the present invention thereto.

Various equivalent changes, alternations or modifications based on the claims of present invention are all consequently viewed as being embraced by the scope of the present invention.

What is claimed is:

1. A display backlight module adapted to an LCD device, comprising:
    an edge-type backlight source module, comprising:
        a light source;
        a light-guide plate coupled with the light source;
        a light-reflecting plate, disposed on one side of the light-guide plate, for reflecting a downward light entering the light-guide plate from the light source;
        a multi-layer reflective film, disposed on a light-emitting surface of the edge-type backlight source module, formed of multiple inter-stacked polymer films with difference refractive indexes, and an interference principle being incorporated to reflecting or transmitting the light with a specific wavelength range; wherein the multi-layer reflective film has a first surface and a second surface, a surface structure having a plurality of diffusing particles is formed on the first surface or the second surface; the multi-layer reflective film includes an ultraviolet reflector with additive transparent plastic particles for reflecting ultraviolet radiation;
        a reflective cavity being defined between the multi-layer reflective film and the light-reflecting plate, and multiple reflections, refractions, and scatterings of the light are created within the reflective cavity; and
    an optical film module, disposed between the edge-type backlight source module and a liquid crystal display panel, and at least one brightness-enhancement film and a diffusion film are included.

2. The module of claim 1, wherein the surface structure is formed on the first surface or the second surface by a coating or extruding process.

3. The module of claim 1, wherein the multi-layer reflective film is under a uniaxial stretching process, and the multi-layer reflective film has an average transmittance ranging from about 30% to about 90% within optical spectrum between 400 nm and 700 nm.

4. The module of claim 1, wherein multi-layer reflective film is under a biaxial stretching process, and the multi-layer reflective film has an average transmittance ranging from about 30% to about 90% within optical spectrum between 400 nm and 700 nm.

5. A display backlight module adapted to an LCD device, comprising:
    a direct-type backlight source module, comprising:
        a light source;
        a light-reflecting plate, coupled with the light source, for reflecting a downward light from the light source;
        a multi-layer reflective film, disposed on a light-emitting surface of the direct-type backlight source module, and formed of multiple inter-stacked polymer films with difference refractive indexes, and an interference principle being incorporated to reflecting or transmitting the light with a specific wavelength range; wherein the multi-layer reflective film has a first surface and a second surface, a surface structure having a plurality of diffusing particles is formed on the first surface or the second surface; the multi-layer reflective film is adhered with an ultraviolet reflector with additive transparent plastic particles for reflecting ultraviolet radiation;
        a reflective cavity being defined between the multi-layer reflective film and the light-reflecting plate, and multiple reflections, refractions and scatterings of the light are created within the reflective cavity; and
    an optical film module, disposed between the direct-type backlight source module and a liquid crystal display panel, and at least one brightness-enhancement film and a diffusion film are included.

6. The module of claim 5, wherein the surface structure is formed on the first surface or the second surface by a coating or extruding process.

7. The module of claim 5, wherein the multi-layer reflective film is under a uniaxial stretching process, and the multi-layer reflective film has an average transmittance ranging from 30% to 90% within optical spectrum between 400 nm and 700 nm.

8. The module of claim 5, wherein the multi-layer reflective film is under a biaxial stretching process, and the multi-layer reflective film has an average transmittance ranging from 30% to 90% within optical spectrum between 400 nm and 700 nm.

9. A method for manufacturing a display backlight module, comprising:
    preparing a liquid crystal display panel;
    assembling an optical film module on one surface of the liquid crystal display panel, wherein the optical film at least includes a diffusion film and a brightness-enhancement film; and
    forming a backlight source module, which includes a light source and a light-reflecting component, on one side of an assembly of the liquid crystal display panel and the optical film module;
    within the backlight source module, forming an ultraviolet reflector for reflecting the unnecessary ultraviolet radiation;
    wherein, a light-emitting surface of the backlight source module is disposed with a multi-layer reflective film, and the multi-layer reflective film is formed of multiple inter-stacked polymer films with different refractive indexes by a co-extrusion process;
    upon the multi-layer reflective film coating a surface structure on one surface of the multi-layer reflective film;
    an interference principle is incorporated to reflecting or transmitting the light with a specific wavelength range;
    a reflective cavity is defined between the light-reflecting component and the multi-layer reflective film, and multiple reflections, refractions, and scatterings of the light are created within the reflective cavity.

10. The method of claim 9, wherein the multi-layer reflective film is under a uniaxial stretching process to form an optical component with polarization; the multi-layer reflective film under the uniaxial stretching process has an average transmittance ranging from 30% to 90% within optical spectrum between 400 nm and 700 nm.

11. The method of claim 9, wherein the multi-layer reflective film is under a biaxial stretching process for controlling a ratio of P-polarization and S-polarization of the multi-layer reflective film; the multi-layer reflective film under the biaxial stretching process has an average transmittance ranging from 30% to 90% within optical spectrum between 400 nm and 700 nm.

12. The method of claim 9, wherein the ultraviolet reflector is made by a co-extrusion, a coating, a sputtering or an evaporation process.

* * * * *